(12) United States Patent
Schwarz et al.

(10) Patent No.: US 9,221,120 B2
(45) Date of Patent: Dec. 29, 2015

(54) ALUMINUM FAN BLADE CONSTRUCTION WITH WELDED COVER

(75) Inventors: Frederick M. Schwarz, Glastonbury, CT (US); Michael A. Weisse, Tolland, CT (US)

(73) Assignee: United Technologies Corporation, Hartford, CT (US)

(*) Notice: Subject to any disclaimer, the term of this patent is extended or adjusted under 35 U.S.C. 154(b) by 949 days.

(21) Appl. No.: 13/343,025

(22) Filed: Jan. 4, 2012

(65) Prior Publication Data

US 2013/0167555 A1    Jul. 4, 2013

(51) Int. Cl.
| | | |
|---|---|---|
| *F01D 5/14* | (2006.01) | |
| *B23K 20/12* | (2006.01) | |
| *F01D 5/28* | (2006.01) | |

(52) U.S. Cl.
CPC ............ *B23K 20/1265* (2013.01); *F01D 5/147* (2013.01); *F01D 5/28* (2013.01); *B23K 2201/001* (2013.01); *F05D 2220/36* (2013.01); *F05D 2230/232* (2013.01); *F05D 2300/121* (2013.01)

(58) Field of Classification Search
CPC ....... F04D 29/388; F01D 5/147; F01D 5/286; F01D 5/288; F05D 2230/232; B23K 20/1265
USPC .............. 60/226.1; 244/53 B; 137/15.1, 15.2; 416/231 B, 235, 500, 236 B
See application file for complete search history.

(56) References Cited

U.S. PATENT DOCUMENTS

| | | | |
|---|---|---|---|
| 3,055,437 A * | 9/1962 | Stack | 416/226 |
| 5,536,143 A | 7/1996 | Jacala et al. | |
| 6,364,616 B1 | 4/2002 | Stevenson et al. | |
| 6,471,484 B1 * | 10/2002 | Crall | 416/229 R |
| 6,478,539 B1 | 11/2002 | Trutschel | |
| 6,851,924 B2 | 2/2005 | Mazzola et al. | |
| 6,994,525 B2 | 2/2006 | Weisse et al. | |
| 7,189,064 B2 | 3/2007 | Helder et al. | |
| 7,334,333 B2 | 2/2008 | Palazzini et al. | |
| 7,967,240 B2 * | 6/2011 | Sanders et al. | 244/53 B |
| 2005/0254955 A1 * | 11/2005 | Helder et al. | 416/233 |
| 2009/0060718 A1 | 3/2009 | Goldfinch et al. | |
| 2010/0232974 A1 * | 9/2010 | De Moura et al. | 416/230 |
| 2011/0211965 A1 | 9/2011 | Deal et al. | |

FOREIGN PATENT DOCUMENTS

EP    2184442 A1    5/2010

OTHER PUBLICATIONS

International Search Report and Written Opinion Mailed Mar. 13, 2013.

* cited by examiner

*Primary Examiner* — Craig Kim
(74) *Attorney, Agent, or Firm* — Carlson, Gaskey & Olds, PC

(57) ABSTRACT

An airfoil includes, among other possible things, a main body extending between a leading edge and a trailing edge. Channels are formed into the main body, with a plurality of ribs extending intermediate the channels. A cover skin is attached to the main body. The cover skin is welded to the main body at outer edges. An adhesive is placed between inner surfaces of the cover skin and the main body. The adhesive is deposited inwardly of the outer edges of the cover skin.

19 Claims, 5 Drawing Sheets

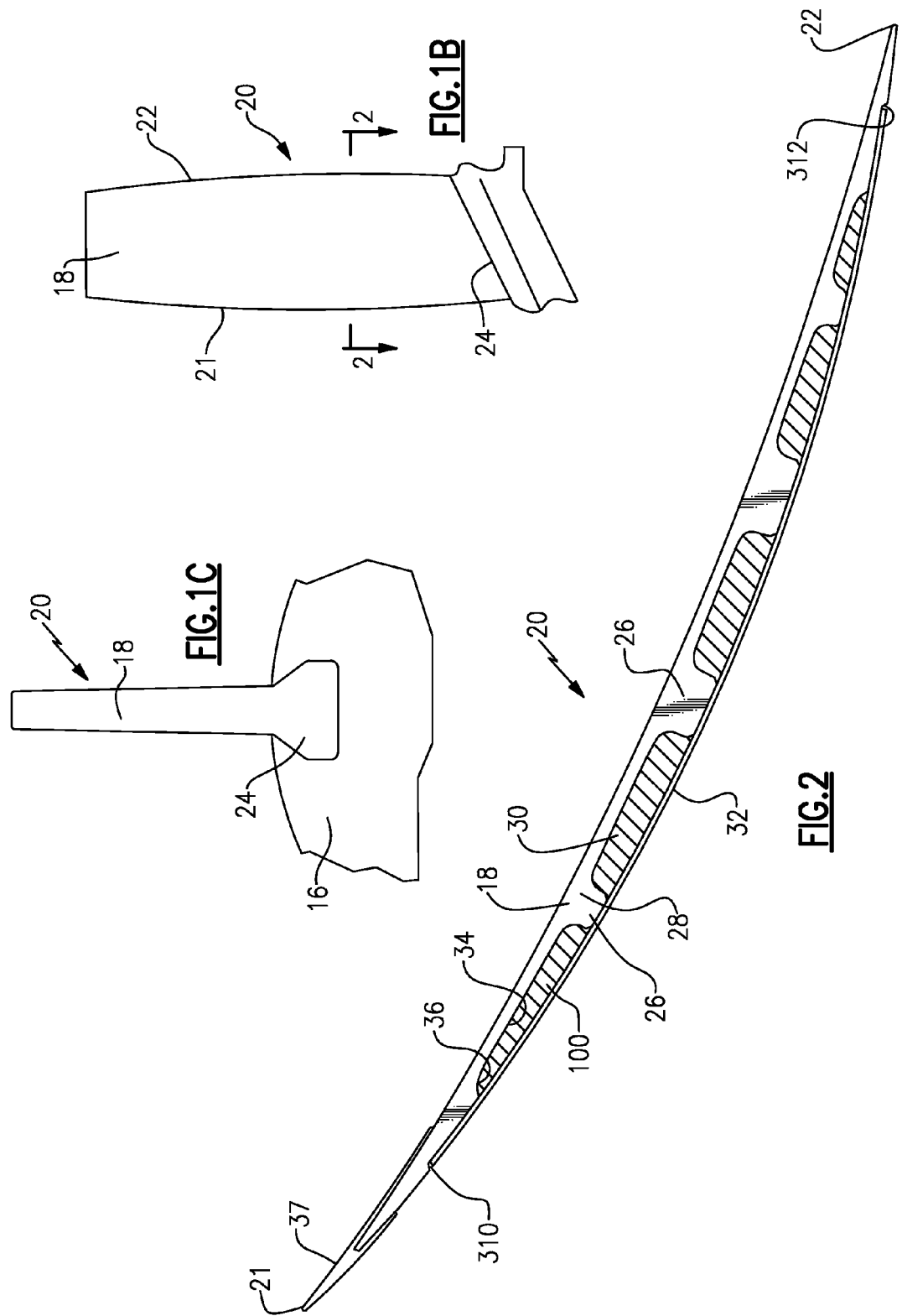

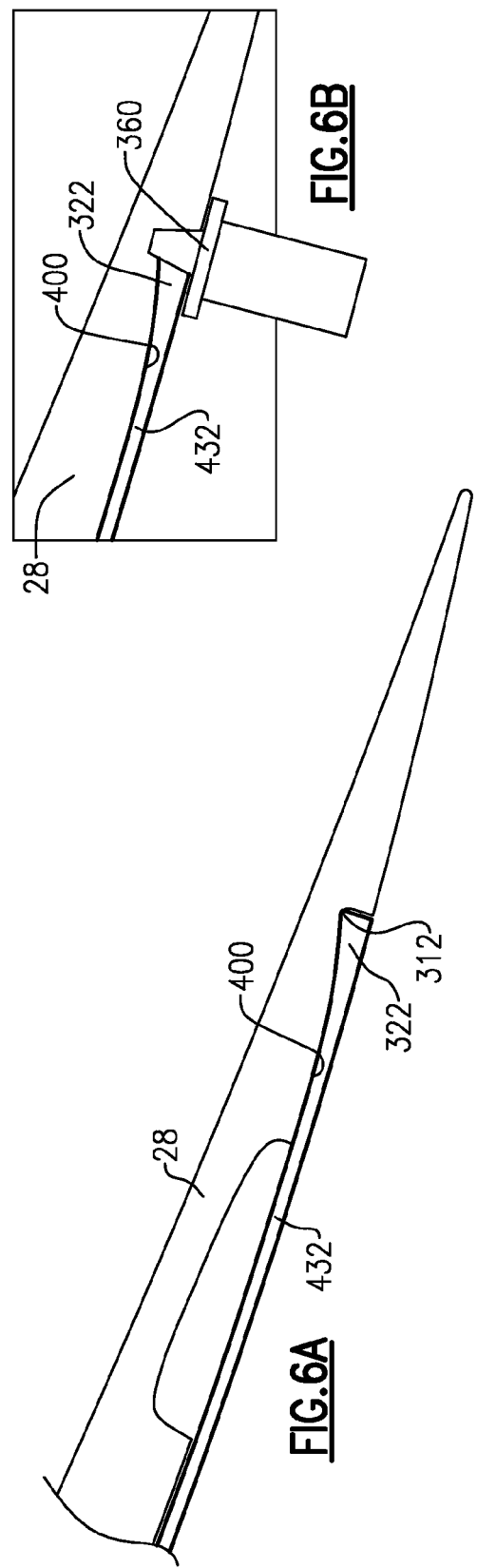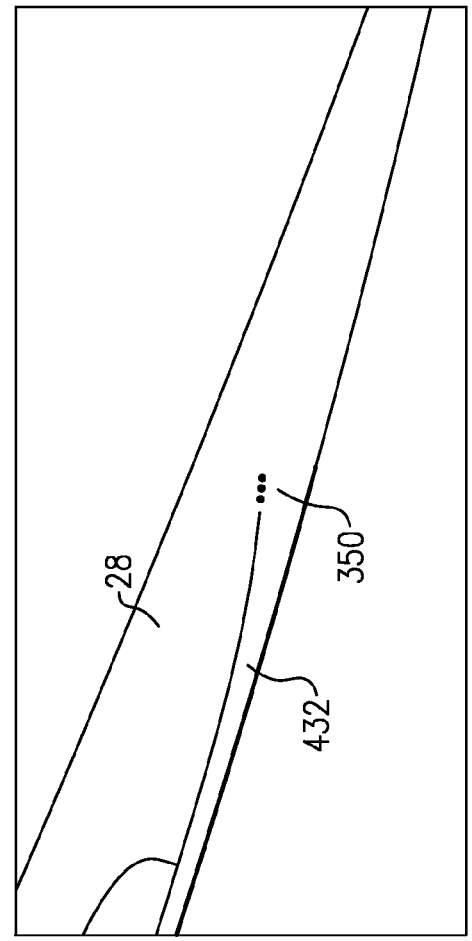

ALUMINUM FAN BLADE CONSTRUCTION WITH WELDED COVER

BACKGROUND

This application relates to a hollow fan blade construction and method of construction wherein a cover is welded to a main blade body, and wherein the cover is also attached to internal components by an adhesive.

Gas turbine engines are known, and typically include a fan delivering air into a compressor section. The air is compressed in the compressor section, delivered into a combustion section, mixed with fuel and burned. Products of this combustion pass downstream over turbine rotors, driving the turbine rotors to rotate.

The turbine rotors in turn drive the compressor rotors and the fan. One recent development in gas turbine engines is a so-called "geared" fan. A gear reduction is provided between a turbine spool driving a low pressure compressor and the fan. In this manner, the speed of the fan can be varied relative to the speed of the low pressure compressor. With such an arrangement, larger fan blades can be utilized.

To reduce the weight associated with the larger fan blades, hollow aluminum fan blades arrangements have been proposed. These hollow blades typically have a number of hollow channels which may or may not include a light weight filler. A cover skin is typically adhesively bonded to the main body to enclose the hollow fan blade.

SUMMARY

In a featured airfoil embodiment, a main body extends between a leading edge and a trailing edge. Channels are formed into the main body, with a plurality of ribs extending intermediate the channels. A cover skin is attached to the main body. The cover skin is welded to the main body at outer edges. An adhesive is positioned between inner surfaces of the cover skin and the main body, and the adhesive is deposited inwardly of outer edges of the cover skin.

In another embodiment according to the foregoing embodiment, the main body defines a ledge having outer edges formed into the main body at at least one face. The cover skin sits on the ledge with the adhesive being deposited inwardly of the ledge such that the adhesive is not adjacent to the weld.

In another embodiment according to any of the foregoing embodiments, the adhesive extends outwardly to inner extents of the ledge.

In another embodiment according to prior embodiments, the adhesive is deposited inwardly of the inner extents of the ledge.

In another embodiment, a material is positioned in at least one of the channels, with the adhesive being formed over at least portions of the material and portions of the ribs.

In another embodiment, the cover skin has thicker edges such that when welded to the main body, the thicker edges provide strengthened regions.

In another embodiment according to prior embodiments, the weld joint is provided by stir welding.

In another embodiment, the channels extent into the main body to a closed end from an open end such that there is a single cover skin closing off the channels.

In another embodiment, the airfoil is part of a fan blade having a dovetail with the airfoil extending radially outwardly from the dovetail.

In another featured embodiment, a method of constructing a fan blade comprises the steps of providing adhesive on a main body extending between a leading edge and a trailing edge. Channels are formed into the main body and a plurality of ribs extend intermediate the channels. A cover skin is placed over the channels. The cover skin is welded to the main body, with the adhesive being provided such that it will be spaced inwardly of the location of a weld joint.

In another embodiment according to the prior method, the main body defines a ledge having outer edges formed into the main body at at least one face, and the cover skins sits on the ledge. The adhesive is deposited inwardly of the ledge such that the adhesive is not adjacent to the weld.

In another embodiment according to prior method embodiments, the adhesive extends outwardly to inner extents of the ledge.

In another embodiment according to prior method embodiments, the adhesive is deposited inwardly of inner extents of the ledge.

In another embodiment according to the method, the cover skin has thicker edges such that when welded to the main body the thicker edges provide strengthened regions.

In another embodiment according to the method, the weld joint is formed by stir welding.

In another featured embodiment, a gas turbine engine includes a fan section delivering air into a compressor section. Air is compressed by the compressor section and delivered into a combustor where it is mixed with fuel and combusted. Products of this combustion pass downstream over a turbine section. The fan section includes a plurality of fan blades, with each of the fan blades having a main body that extends between a leading edge and a trailing edge. Channels are formed into the main body, with a plurality of ribs extending intermediate the channels. The fan blade has a dovetail and an airfoil that extends radially outwardly from the dovetail. A cover skin is attached to the main body and closes off the channels. The cover skin is welded to the main body at outer edges. An adhesive is positioned between inner surfaces of the cover skin and the main body, and the adhesive is deposited inwardly of outer edges of the cover skin.

In another embodiment, the main body defines a ledge having outer edges formed into the main body at at least one face. The cover skin sits on the ledge with the adhesive being deposited inwardly of the ledge such that the adhesive is not adjacent to the weld.

In another embodiment according to any of the foregoing embodiments, the adhesive extends outwardly to inner extents of the ledge.

In another embodiment according to prior embodiments, the adhesive is deposited inwardly of the inner extents of the ledge.

In another embodiment, a material is positioned in at least one of the channels, with the adhesive being formed over at least portions of the material and portions of the ribs.

In another embodiment, the cover skin has thicker edges such that when welded to the main body, the thicker edges provide strengthened regions.

In another embodiment according to prior embodiments, the weld joint is provided by stir welding.

In another embodiment, the channels extent into the main body to a closed end from an open end such that there is a single cover skin closing off the channels.

These and other features of the invention would be better understood from the following specifications and drawings, the following of which is a brief description.

BRIEF DESCRIPTION OF THE DRAWINGS

FIG. 1B shows a fan blade according to this invention.

FIG. 1C is a view of a fan blade mounted in a fan rotor.

FIG. 2 is a cross-sectional view along line 2-2 of FIG. 1B.

FIG. 6A shows a first step in assembling the cover to the blade.

FIG. 6B shows a subsequent step.

FIG. 6C shows the final arrangement.

DETAILED DESCRIPTION

Figure 1A:
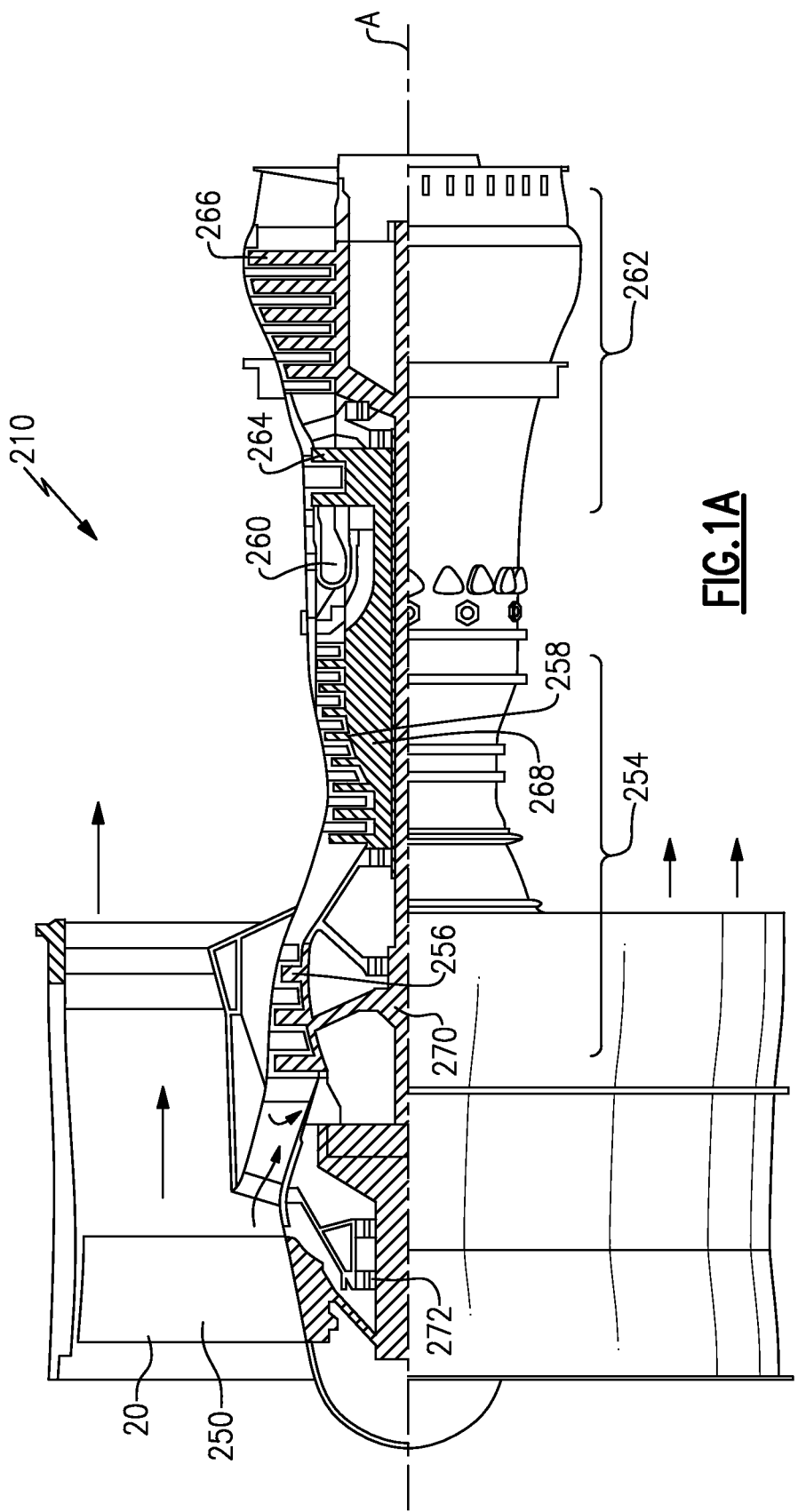
FIG. 1A shows a typical gas turbine engine.

A gas turbine engine 210 is shown in FIG. 1A. As shown, the engine 210 includes a fan 250 (which includes a plurality of fan blades 20), a compressor section 254 (which includes both a low pressure compressor 256 and a high pressure compressor 258), a combustor 260, and a turbine section 262 (which includes both a high pressure turbine 264 and a low pressure turbine 266). The fan 250 delivers air into compressor section 254. Air compressed by the compressor section is delivered into combustor 260. Products of the combustion in the combustor pass downstream over turbine section 262. The high pressure compressor 258 is driven, via a first spool 268, by the high pressure turbine 264. The low pressure compressor 256 is driven, via a second spool 270, by the low pressure turbine 266. Also driven by the low pressure turbine 266 are the fan blades 20 of the fan 250, which fan is coupled to the second spool 270 via a gear 272. While an engine with two spools is shown, the application extends to three spool engines, and engines having alternative constructions.

A fan blade 20 is illustrated in FIG. 1B having an airfoil 18 extending radially outwardly from a dovetail 24. A leading edge 21 and a trailing edge 22 define the forward and rear limits of the airfoil 18.

As shown in FIG. 1C, a fan rotor 16 receives the dovetail 24 to mount the fan blade with the airfoil 18 extending radially outwardly. As the rotor is driven to rotate, it carries the fan blade with it. There are higher stresses in fan blade 20 adjacent to the rotor 16 then occur radially outwardly.

FIG. 2 shows a cross-section of the fan blade 20, at the airfoil 18. As shown, the leading edge 21 carries a sheath 37 secured to a main body 28. A cover skin 32 closes off cavities or channels 30 in the main body 28. The main body 28 and the skin 32 may all be formed of aluminum or various aluminum alloys. Other materials, such as titanium, titanium alloys or appropriate metals may alternatively be utilized. The sheath 37 is typically formed of a titanium alloy.

In addition, while the fan blade is shown having one cover, and the channels 30 having a closed inner end 34, it is also possible that the main body would provide a channel extending across its entire thickness, with covers at each side.

As shown, a plurality of ribs 26 separate channels 30 in the cross-section illustrated in FIG. 2. As shown, filler material 100 may be deposited within the channels 30. The filler material 100 would typically be of a lighter weight than the main body 28. As one example, an aluminum foam may be used as material 100. Other light weight filters, such as honeycomb material, or other materials, may be used.

Figure 3:
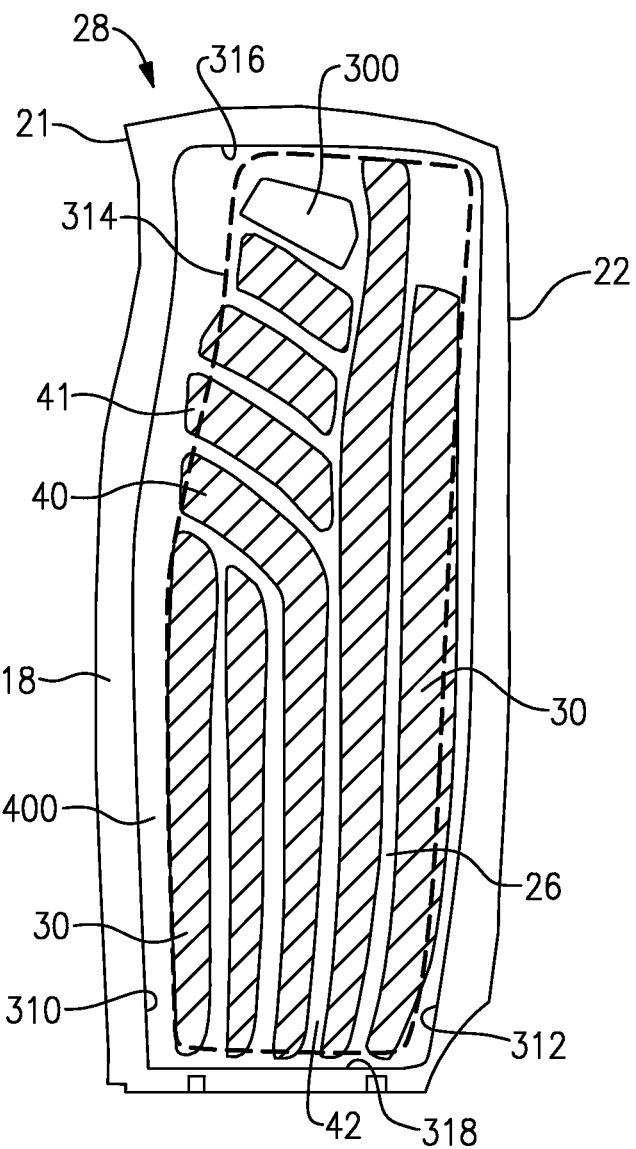
FIG. 3 shows the internal detail of the fan blade.

FIG. 3 shows the main body 28. There are a plurality of channels 30 spaced from the front or leading edge 21 to the back or trailing edge 22. As shown, some of the channels 30 extend generally radially upwardly. Other channels, such as channel 40, bend toward the leading edge 21. Channel 41 simply extends generally from the middle of the main body 28 toward the leading edge 21. Channel 300 receives no material. Any or all of the channels may be left empty.

As shown in FIG. 3, the main body 28 includes a ledge 400 defined by ledge edge 310, 312, 316 and 318. Edges 310 and 312 are also shown in FIG. 2 at the forward and rearward ends. As is clear, from FIG. 2 the cover 32 sits on ledge 400 when assembled. As shown in FIG. 3, an outline 314 of adhesive is positioned laterally inwardly from the edges 310, 312, 316 and 318.

Figure 4:
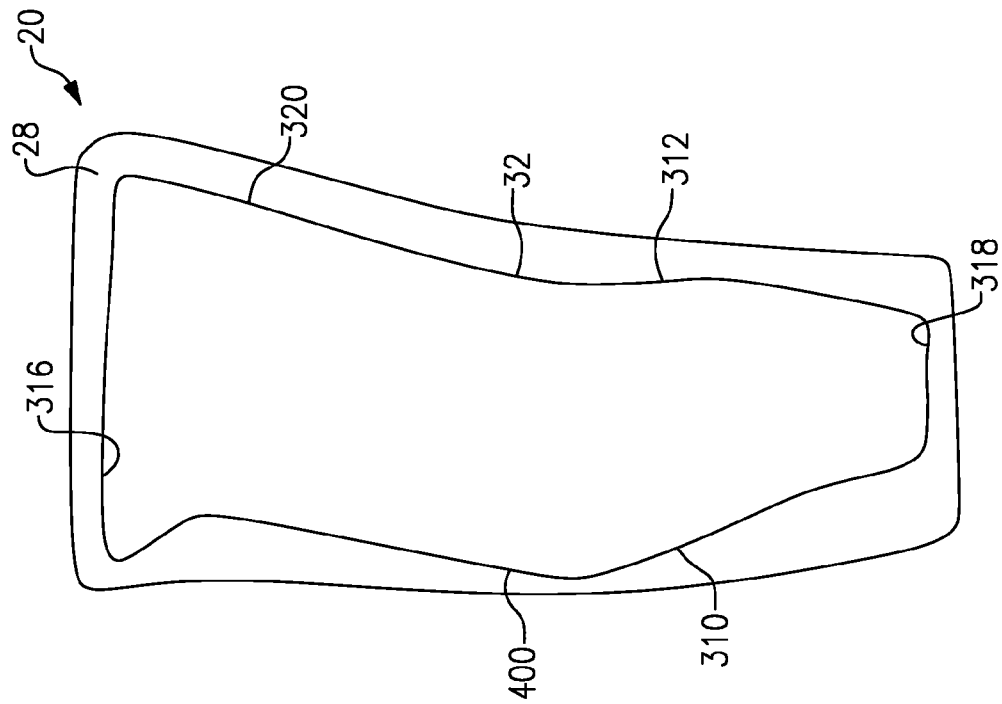
FIG. 4 shows an assembled fan blade, with a cover attached.

As shown in FIG. 4, when the cover skin 32 is assembled on the main body 28, it sits adjacent ends of ledge 400. Then, friction stir welding as shown at 320 is provided along the entire periphery of the cover 32 to secure the cover to the main body.

Since the adhesive is positioned inwardly from edges 310, 312, 316 and 318, the adhesive will not move into the area adjacent to the friction stir weld 320, where it might reduce the weld quality.

Figure 5:
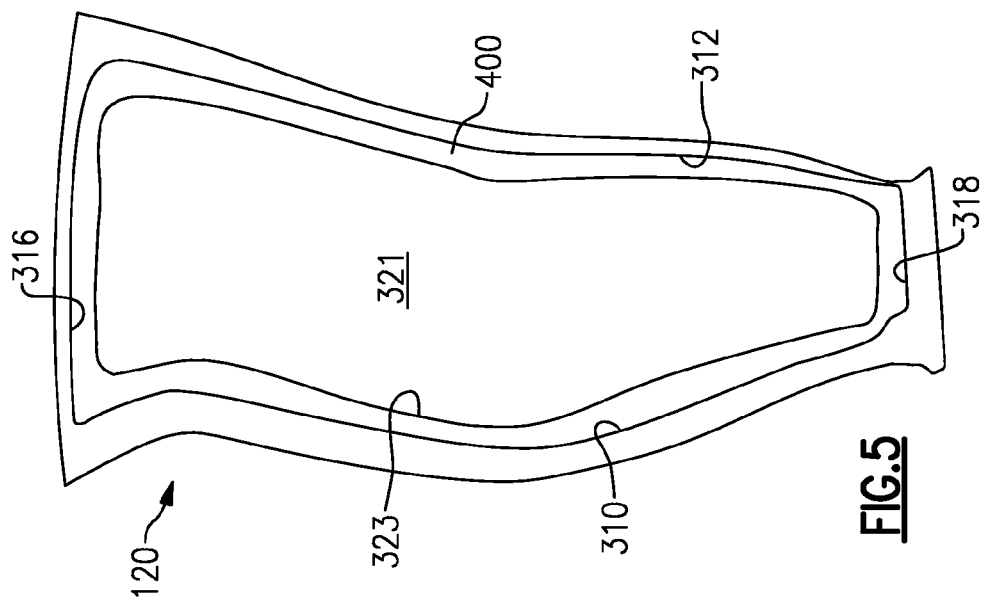
FIG. 5 shows an alternative to the FIG. 4 adhesive arrangement.

FIG. 5 shows an alternative wherein there is a greater area of adhesive 321, with the adhesive moving generally outwardly to an outline 323 that fills all of the area inwardly of ledge 400. If the adhesive has been positioned such that it extends on to the ledge 400, it can be removed prior to welding of the cover. In addition, a worker in this art should recognize that when placing cover 32 onto the main body 18, it is possible that adhesive will be squeezed outwardly, and this should be taken into account when designing the coverage area of the adhesive.

As a further alternative, a braze material could be deposited along the inner edges of the ledge to block adhesive. In addition, the braze material can be selected such that it will melt at temperatures below that of the welding such that the braze material will assist in forming a stronger bond between the cover and the main body.

While an embodiment is shown having a single cover, and with the channels 30 having closed back ends 34, this application would also extend to a main body having covers at each of the two sides, with the channels extending through the entire width of the blade.

FIG. 6A shows an alternative embodiment the cover skin 432 as initially placed on the main body 28. As shown at the edge 312, there is an enlarged portion 322, which is thicker than the nominal portions of the cover skin 432.

FIG. 6B shows the application of the friction stir weld through a tool 360. As shown in FIG. 6C, after this operation, the material from the main body 28 and the enlarged portion 322 have generally intermixed. That is, the thicker area provides a stronger cross-section, or strengthened regions, and will result in less stress at this combined area 350.

While a fan blade is specifically disclosed, it should be understood that aspects of this disclosure would extend to any number of other type of airfoils.

Although embodiments of this invention have been disclosed, a worker of ordinary skill in this art would recognize that certain modifications would come within the scope of this invention. For that reason, the following claims should be studied to determine the true scope and content of this invention.

The invention claimed is:

1. An airfoil comprising:
    a main body extending between a leading edge and a trailing edge, and channels formed into said main body, with a plurality of ribs extending intermediate the channels;
    a cover skin attached to said main body, said cover skin being welded to said main body with a weld at outer edges of said cover skin, and an adhesive between inner surfaces of said cover skin and said main body, with said adhesive being deposited inwardly of said outer edges of said cover skin, wherein said airfoil extends radially outwardly from a dovetail; and said airfoil and dovetail together form a fan blade for a gas turbine engine.

2. The airfoil as set forth in claim 1, wherein said main body defines a ledge having outer edges formed into said main body at at least one face, and said cover skin sitting on said ledge, with said adhesive being deposited inwardly of said ledge such that said adhesive is not adjacent to said weld.

3. The airfoil as set forth in claim 2, wherein said adhesive extends outwardly to inner extents of said ledge.

4. The airfoil as set forth in claim 2 wherein said adhesive is deposited inwardly of inner extents of said ledge.

5. The airfoil as set forth in claim 1, wherein a material is positioned in at least one of said channels, and said adhesive being formed over at least portions of said material and portions of said ribs.

6. The airfoil as set forth in claim 1, wherein said cover skin has thicker edges, such that when welded to said main body, said thicker edges provide strengthened regions.

7. An airfoil comprising:
a main body extending between a leading edge and a trailing edge, and channels formed into said main body, with a plurality of ribs extending intermediate the channels; and
a cover skin attached to said main body, said cover skin being welded to said main body with a weld at outer edges of said cover skin to form a weld joint, and an adhesive between inner surfaces of said cover skin and said main body, with said adhesive being deposited inwardly of said outer edges of said cover skin, wherein said cover skin has thicker edges, such that when welded to said main body, said thicker edges provide strengthened regions, and
wherein said weld joint is provided by stir welding.

8. The airfoil as set forth in claim 1, wherein said channels extend into the main body to a closed end from an open end, such that there is a single cover skin closing off said channels.

9. A method of constructing an airfoil comprising:
providing adhesive on a main body extending between a leading edge and a trailing edge, and having channels formed into the main body, with a plurality of ribs extending intermediate the channels;
placing a cover skin over the channels, and
welding the cover skin to the main body to form a weld joint, the adhesive being provided such that it will be spaced inwardly of the location of said weld joint, and said weld joint is formed by stir welding.

10. The method as set forth in claim 9, wherein said main body defines a ledge having outer edges formed into said main body at least one face, and said cover skin sitting on said ledge, with said adhesive being deposited inwardly of said ledge such that said adhesive is not adjacent to said weld joint.

11. The method as set forth in claim 10, wherein said adhesive extends outwardly to inner extents of said ledge.

12. The method as set forth in claim 10, wherein said adhesive is deposited inwardly of inner extents of said ledge.

13. The method as set forth in claim 9, wherein said cover skin has thicker edges, such that when welded to said main body, said thicker edges provide strengthened regions.

14. A gas turbine engine comprising:
a fan section delivering air into a compressor section, air compressed by the compressor section delivered into a combustor where it is mixed with fuel and combusted, products of the combustion pass downstream over a turbine section;
said fan section including a plurality of fan blades, with said fan blades comprising a main body extending between a leading edge and a trailing edge, and channels formed into said main body, with a plurality of ribs extending intermediate the channels, the fan blade having a dovetail, and an airfoil extending radially outwardly from said dovetail; and
a cover skin attached to said main body, and closing off said channels, said cover skin being welded to said main body with a weld at outer edges of said cover skin, and an adhesive between inner surfaces of said cover skin and said main body, with said adhesive being deposited inwardly of said edges of said cover skin.

15. The engine as set forth in claim 14, wherein said main body defines a ledge having outer edges formed into said main body at at least one face, and said cover skin sitting on said ledge, with said adhesive being deposited inwardly of said ledge such that said adhesive is not adjacent to said weld.

16. The engine as set forth in claim 15, wherein said adhesive extends outwardly to inner extents of said ledge.

17. The engine as set forth in claim 15 wherein said adhesive is deposited inwardly of inner extents of said ledge.

18. The engine as set forth in claim 14, wherein a foam material is positioned in at least one of said channels, and said adhesive being formed over at least portions of said foam and portions of said ribs.

19. The engine as set forth in claim 14, wherein said cover skin has thicker edges, such that when welded to said main body, said thicker edges provide strengthened regions.

* * * * *